United States Patent
Deevi et al.

(10) Patent No.: US 6,489,043 B1
(45) Date of Patent: Dec. 3, 2002

(54) IRON ALUMINIDE FUEL INJECTOR COMPONENT

(75) Inventors: Seetharama C. Deevi, Midlothian, VA (US); Shalva Gedevanishvili, Richmond, VA (US); Sohini Paldey, Midlothian, VA (US)

(73) Assignee: Chrysalis Technologies Incorporated, Richmond, VA (US)

( * ) Notice: Subject to any disclaimer, the term of this patent is extended or adjusted under 35 U.S.C. 154(b) by 0 days.

(21) Appl. No.: 09/986,710

(22) Filed: Nov. 9, 2001

(51) Int. Cl.⁷ .............................. B32B 15/01; B22F 5/00
(52) U.S. Cl. ................... 428/681; 123/188.1; 148/285; 148/287; 148/529; 148/530; 148/535; 148/546; 148/550; 419/1; 419/66; 428/544; 428/546; 428/629; 428/679; 428/682; 428/457; 428/469; 428/938; 428/941
(58) Field of Search .............................. 428/681, 544, 428/546, 629, 679, 682, 457, 469, 938, 941; 123/188.1; 419/1, 66; 420/77; 148/320, 902, 285, 287, 529, 530, 535, 546, 550

(56) References Cited

U.S. PATENT DOCUMENTS 5,328,527 A * 7/1994 Kurup et al. ................ 148/902
6,033,623 A * 3/2000 Deevi et al. ................... 419/45

* cited by examiner

Primary Examiner—Robert R. Koehler
(74) Attorney, Agent, or Firm—Burns, Doane, Swecker & Mathis, LLP

(57) ABSTRACT

An iron aluminide fuel injector component such as a nozzle, plunger or other part is manufactured from iron aluminide or includes an iron aluminide coating on at least a portion of a surface in contact with the fuel which passes through the fuel injector. The iron aluminide alloy can include 8 to 32 wt. % Al, up to 5 wt. % refractory metal, B and/or C in amounts sufficient to form borides and/or carbides. The fuel injector component can be formed from powders of the iron aluminide alloy by powder metallurgy techniques and the coating can be formed by a diffusional reaction process, cathodic plasma process, chemical vapor deposition or physical vapor deposition. The fuel injector component is corrosion, carburization, sulfidation and/or coking resistant.

20 Claims, 8 Drawing Sheets

|←— 6mm —→|

Before oxidation

Top side

Bottom side

After oxidation

Top side

Bottom side

Before oxidation
Top side

Bottom side

After oxidation
Top side

Bottom side

# IRON ALUMINIDE FUEL INJECTOR COMPONENT

BACKGROUND

Field of the Invention

The present invention is directed generally to apparatus for controlling fuel input into a spark ignited and direct injection internal combustion engine. More specifically, the present invention is directed to fuel injector apparatus having a component such as a nozzle and/or plunger manufactured from an iron aluminide alloy or having at least a portion of a fuel contacting surface coated with an iron aluminide alloy.

BACKGROUND OF THE INVENTION

Internal combustion engines operate by combusting fuel supplied to one or more combustion chambers. It is conventional to use one or more fuel injectors to supply fuel to an individual combustion chamber. See, for example, U.S. Pat. Nos. 4,458,655; 4,886,032; 5,331,937; 5,482,023; 6,067,970; and 6,155,212. Of these, the '655 patent states that the fuel injector is made of steel and other components such as the spray tip body, spray tip, bushing, valve, coil spring, spacer ring, cap, adjusting screw are made of an electrically conductive material such as steel. The '212 patent discloses use of catalytic coatings such as platinum, palladium, osmium, iridium, nickel, nickel oxide and intermetallics of transition metals such as vanadium-copper-zinc on the surface of valve seats of an electrode spray nozzle. To improve cold starting capabilities, some fuel injectors deliver heated fuel to the combustion chamber. See, for example, U.S. Pat. No. 5,758,826. Some fuel injectors can incorporate an integral fuel pump and/or sensor arrangement. See, for example, U.S. Pat. Nos. 5,716,001 and 6,283,095.

Fuel injectors have been proposed for direct injection engines. See, for example, U.S. Pat. Nos. 6,116,218; 6,267,307; and 6,295,969. Of these, the '307 patent states that a high-performance ceramic coating can be deposited on injector tips made from a nickel and chrome alloy. According to the '969 patent, direct injection can be used for two-cycle or four-cycle engines such as outboard motors or other engines for marine propulsion or land vehicles or utility machines such as lawn mowers.

Conventional fuel injectors can include a housing having an internal passage and the injector can be installed in a fuel rail to supply the passage with fuel under pressure. A solenoid operated needle valve can be moved on and off a valve seat to control the outflow of fuel from the injector from the injector nozzle or tip. The injector nozzle can be received in a bore in an intake manifold or cylinder head runner passage of a spark ignited and direct injection internal combustion engine. With such an arrangement, fuel can be injected in the form of a spray as an aid to vaporization of the fuel.

Fuel injectors can be designed to operate with a given fuel volumetric flow rate and a fuel spray pattern for optimization of fuel economy and reduction in exhaust emissions. A recognized problem in fuel injection is the formation of coke that can foul the injector nozzle. Coking is a surface phenomenon which has bee observed with iron and nickel-based alloys containing chromium in the range of 10 to 25 wt. %. In addition to negatively impacting thermal performance, coking can result in an excessive pressure drop across the injector nozzle, even blocking of the injector nozzle, thereby adversely affecting the fuel injector and the engine performance. For example, carbon deposits may alter the spray pattern such that the spray penetrates to an undesirable depth in the combustion chamber. Poor atomization can also lead to higher levels of exhaust particles and increase levels of soot in the crank case. Further, coking can lead to increased pressure in the fuel injector, and the degradation of mechanical properties can lead to catastrophic failure of injector nozzles and is a safety hazard.

Another problem in fuel injector nozzles is carburization (e.g., carburization can be severe with alloys such as HP steels, INCO 803, and other materials that contain significant amounts of chromium and nickel). Carburization results in the formation of carbides in the metal matrix or in grain boundaries of metallic components from exposure to a carbon containing atmosphere.

A variety of solutions have been proposed for addressing the problems of coke formation, carburization, and related materials phenomena in fuel injector nozzles. See for example, U.S. Pat. No. 6,267,307 B1 to Pontoppidan, A. A. Aradi, et al., "The Effect of Fuel Composition and Engine Operating Parameters on Injector Deposits in a High-Pressure Direct Injection Gasoline (DIG) Research Engine", *SAE Technical Paper Series,* 1999-01-3690 (1999), and S. Rossi et al., "Corrosion Behavior of P/M Components for Gasoline Injectors", *International Journal of Powder Metallurgy,* Vol. 36, pp. 39–46 (2000).

U.S. Pat. No. 3,582,323 discloses iron-aluminum alloys having 30 to 50 atomic % aluminum and up to 6 atomic % hardening elements(Zr, Mo, C, Ti, V, Ta, La) for exhaust valves of internal combustion engines. U.S. Pat. Nos. 5,328,527 and 5,425,821 disclose an iron aluminum alloy having 9 to 13.3 weight % Al, 0.05 to 0.35% C, 0.5 to 3% refractory metal (V, Mo, Nb, W, Ta) and/or 0.3 to 1.5% Ti for an intake valve of an internal combustion engine. U.S. Pat. No. 6,085,714 states that titanium aluminide has been proposed as a replacement for steel inlet and exhaust valves.

Commonly owned U.S. Pat. No. 5,620,651 discloses aluminum containing iron base alloys useful as coatings having oxidation and corrosion resistance or as sulfidization or corrosion resistant materials for use in the chemical industry, pipe for conveying coal slurry or coal tar, substrate materials for catalytic converters, exhaust pipes for automotive engines or porous filters. According to U.S. Pat. No. 3,026,197, iron base alloys having 10 to 18 weight % aluminum can be alloyed with Zr and B to refine the grain structure and thus enhance workability of the otherwise brittle alloys.

Thus it would be advantageous to limit the deposition of carbon and carbon by-products on the interior surfaces of components of fuel injectors and to inhibit the carburization of system metallurgical components. Additionally, it would be advantageous that the fuel injector material exhibit strength at operating temperatures and oxidation resistance. Thus, there is a need in the art for fuel injector materials with improved materials performance that address these needs and others.

SUMMARY OF THE INVENTION

The invention provides a component of a fuel injector such as an injector nozzle or plunger wherein the component comprises a coating or bulk part of an iron aluminide alloy. The injector nozzle can have any desired configuration. For example, the injector nozzle can include a recess in a first surface adapted to engage a plunger of the fuel injector.

Alternatively, the injector nozzle can include a body formed from a first material and having a recess in a first surface adapted to engage a plunger of the fuel injector, and a coating of a second material disposed on at least a portion of the recess wherein the second material is an iron aluminide alloy. In a preferred embodiment, the recess is substantially in the form of an inverted frustum of a right circular cone.

The iron aluminide alloy can be cast and thermomechanically processed into the shape of the component or the component can be made by sintering an iron aluminide alloy powder. The iron aluminide alloy preferably has at least 8 wt. % aluminum and optional alloying additions such as up to 5 wt. % of one or more refractory metals (e.g., Ti, Ta, Nb, W, Cr, Mo, V, Hf and Zr), up to 0.02 wt. % B, up to 0.5 wt. % C, up to 1% rare earth metal (e.g., Y, La, etc.). For example, the iron aluminide can further comprise B and/or C in an amount effective to provide borides and/or carbides in the iron aluminide alloy. If desired, up to 20 vol. % oxide particles can be incorporated in the iron aluminide (e.g., $Al_2O_3$, $Y_2O_3$, etc.). An exemplary iron aluminide can include 10–32 wt. % Al, up to 20 vol. % transition metal oxides, up to 0.020 wt. % B, up to 2.0 wt. % Mo, up to 1.0 wt. % Zr, up to 2.0 wt. % Ti, up to 1.0 wt. % La, up to 0.2 wt. % C, up to 1 wt. % Cr, balance Fe and impurities.

A method of manufacturing a fuel injector component such as an injector nozzle includes hot extruding a cast iron aluminide material and machining the extruded body or pressing an iron aluminide powder into a shape and sintering the shape to a density of at least 90% theoretical density. For example, the iron aluminide can be a sintered nanocrystalline iron aluminide powder. If desired, the fuel injector component can be formed by forming iron aluminide powder into a body and sintering the body to a density of at least 90% theoretical density.

In an embodiment in which the fuel injector component has a coating of an iron aluminide alloy, the component is made by forming a first material into the shape of the component and coating an iron aluminide alloy on at least a portion of a surface of the first material that directly contacts fuel during operation. The coating can be formed by various techniques including a diffusion reaction process or a cathodic plasma process.

The fuel injector component can be provided with various properties such as corrosion, carburization, sulfidation and/or coking resistance and a fuel injector with such a component can be operated in a manner which produces reduced greenhouse emissions and reduced particulate matter.

BRIEF DESCRIPTION OF THE DRAWINGS

Various features and advantages of the invention will become apparent from the following detailed description of preferred embodiments in connection with the accompanying drawings in which like numerals designate like elements and in which.

DETAILED DESCRIPTION OF THE PREFERRED EMBODIMENTS

The invention provides improvements to fuel injector components by use of an iron aluminide as a fuel contacting surface of one or more components of the fuel injector. In a preferred embodiment the iron aluminide forms a fuel contacting surface of a fuel injector nozzle plate used in direct injection of gasoline at high pressures into the combustion chamber of an internal combustion engine. The iron aluminide can be oxidized to provide a thin layer of alumina which is resistant to coking during use of the fuel injector component. For example, the component can be oxidized to provide a 0.05 to 10 $\mu$m thick alumina layer.

Figure 1:
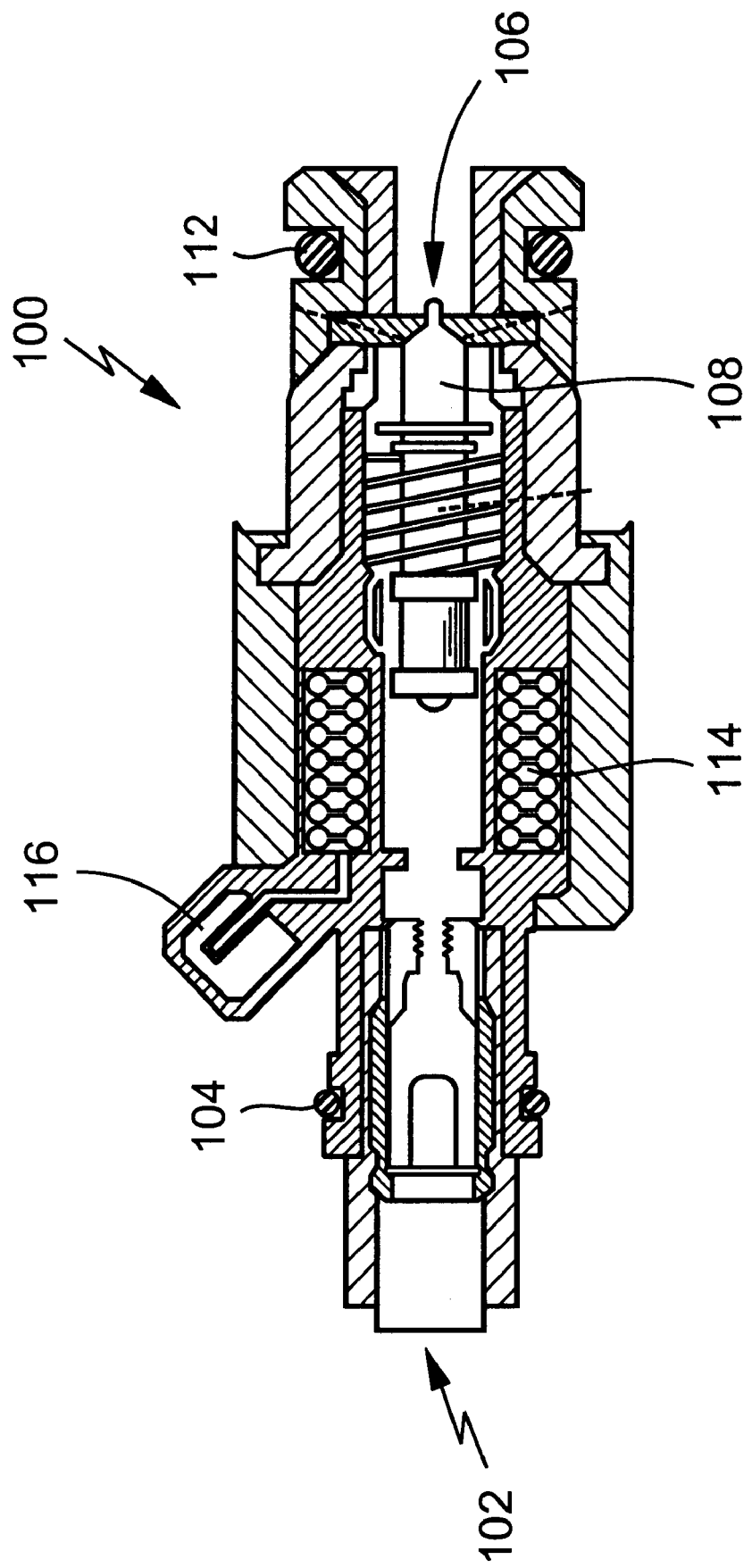
FIG. 1 is a cross-section of a conventional fuel injector.

Details of a conventional fuel injector 100 are shown in FIG. 1. The fuel injector 100 has an elongated enclosure or housing with an open upper end defining a fuel inlet passage 102 adapted to engage a portion of the fuel supply line in a sealed manner. An O-ring 104 can engage the supply line to prevent leakage of fuel. A injector nozzle 106 is disposed at an opposite lower end from the inlet and is substantially a disk or plate with a small orifice or outlet passage formed on one side thereof and a valve seat formed by a recess in the other side thereof. A valve member or plunger 108 is supported for reciprocation in the housing and includes a conically shaped end portion which sealingly engages the recess of the injector nozzle to normally block fuel flow through the housing. An O-ring 112 around the outlet end can engage a portion of the engine structure such as an opening in an intake manifold to prevent vacuum leakage therebetween. The fuel injector 100 is solenoid operated and a solenoid coil 114 is disposed in the housing and can be energized by an application of voltage through a terminal 116 which extends through the housing. In FIG. 1, the valve member 108 is illustrated in its downward or closed position corresponding to the position when the solenoid coil 114 is de-energized. During a normal engine operation, an electronic control unit (ECU) (not shown) applies voltage briefly to the solenoid coil 114. The coil energizes and slidably repositions the valve member 108 to allow a flow of fuel which is sprayed from the outlet of the fuel injector 100 into an inlet passage of the internal combustion engine.

Figure 2:
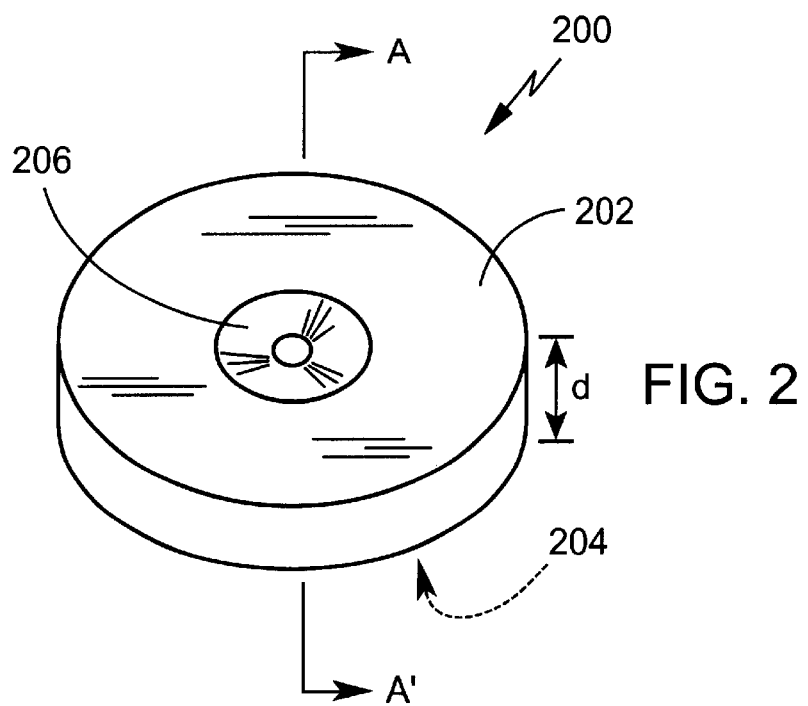
FIG. 2 is perspective view of a first embodiment of an injector nozzle in accordance with the invention.

FIG. 2 is a perspective view of a first embodiment of an injector nozzle 200 in accordance with the invention. The injector nozzle 200 is a substantially circular plate having a thickness (d) and a first side 202 and a second side 204. A recess 206 on the first side 202 is adapted to sealingly engage the end portion of the valve member 108. In the embodiment shown, the shape of the recess 206 is substantially an inverted conical frustum.

Figure 3:
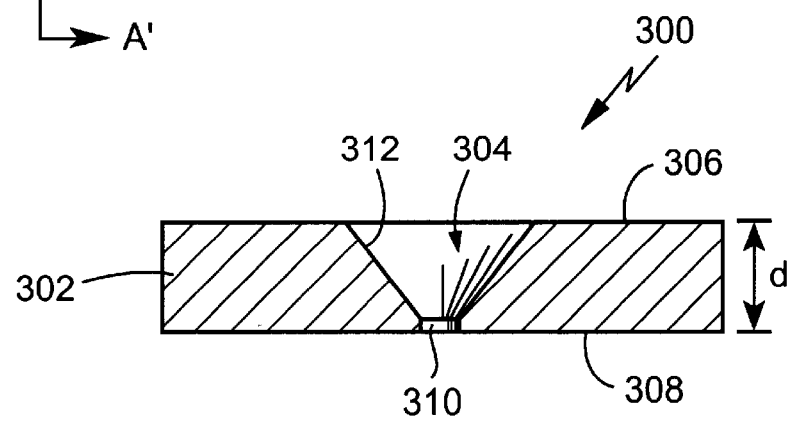
FIG. 3 is a longitudinal cross-section along the line AA' of the injector nozzle shown in FIG. 2.

FIG. 3 is a longitudinal cross-section along the line AA' of the circular injector nozzle shown in FIG. 2. The injector nozzle 300 has a body 302 with a recess 304 on a first side 306. The recess 304 is substantially in the shape of a inverted conical frustum through a major portion of the thickness of the injector nozzle 300. The recess 304 terminates towards the second side 308 of the injector nozzle 300 with a cylindrical outlet opening 310. The conical wall 312 of the recess 304 forms a valve seat for the fuel injector valve member 108.

Figure 4:
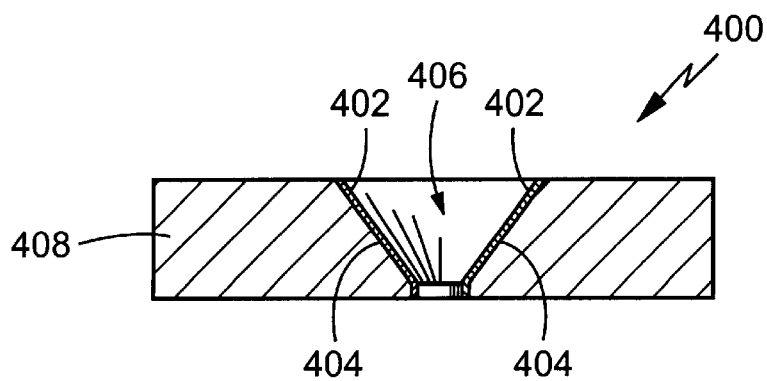
FIG. 4 is longitudinal cross-section of an additional embodiment of a circular injector nozzle according to the invention.

The body 302 of the injector nozzle 300 can be a monolithic iron aluminide alloy, as shown in FIG. 3. Alternatively, as shown in FIG. 4, the injector nozzle 400 can have a coating or lining 402 of an iron aluminide alloy on at least a portion of the conical wall 404 of the recess 406. The coating 402 is directly in contact with the fuel during operation of the fuel injector. When an iron aluminide alloy is used as a coating 402 for the injector nozzle 400, the body 408 of the injector nozzle 400 can be of any suitable material, such as a nickel base or steel alloy. An exemplary material can be HP steel, INCO 803, or 440C steel and the coating can be formed by any suitable technique, e.g., thermal spraying, chemical vapor deposition, physical vapor deposition, etc.

Figure 5A:
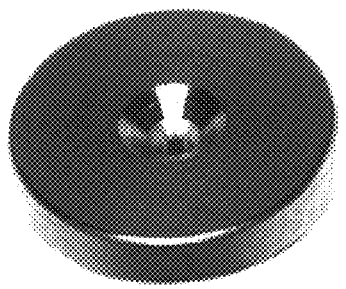
FIG. 5(a) is a perspective view of a conventional injector nozzle made from 440C steel, FIG. 5(b)
Figure 5B:
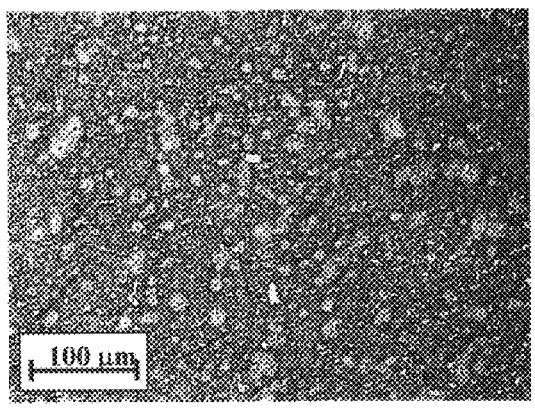
FIG. 5(c) shows a cross section microstructure of the nozzle at different magnifications.
Figure 5C:
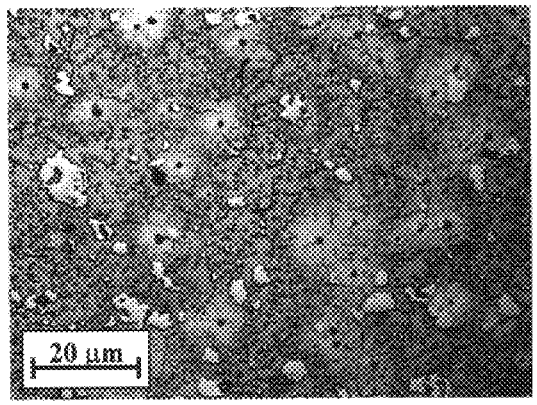

FIGS. 5(a)–(c) show details of a conventional injector nozzle made from 440C steel. FIG. 5(a) is a perspective view of the injector nozzle. FIGS. 5(b)–(c) show two magnifications of the cross sectional microstructure of the fuel injector nozzle.

Figure 6A:
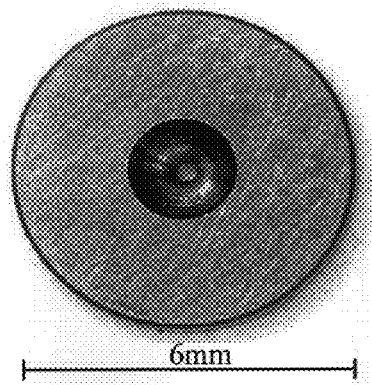
FIG. 6(a) shows a top view of an injector nozzle machined from FeAl and FIGS. 6(b) and 6(c) show micrographs of the microstructure thereof.
Figure 6B:
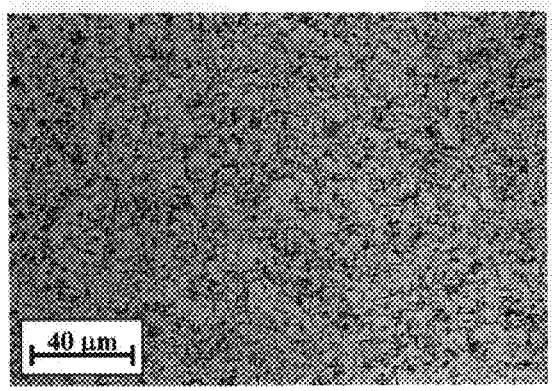
Figure 6C:
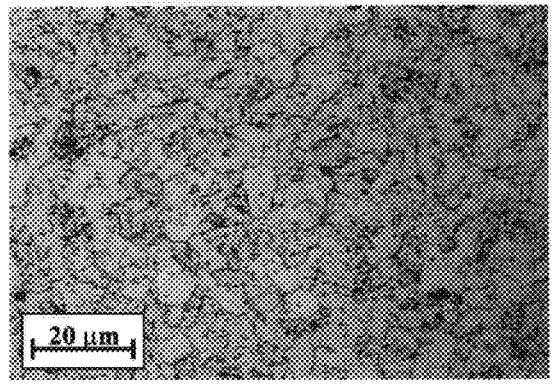

FIGS. 6(a)–(c) are images of an injector nozzle made from iron aluminide (e.g., hot extruded cast iron aluminide which has been machined or forged into a desired shape or pressed and sintered iron aluminide powder). FIG. 6(a) is a plan view of the injector nozzle. FIGS. 6(b)–(c) are two magnifications of the cross section microstructure of the injector nozzle.

Figure 7A:
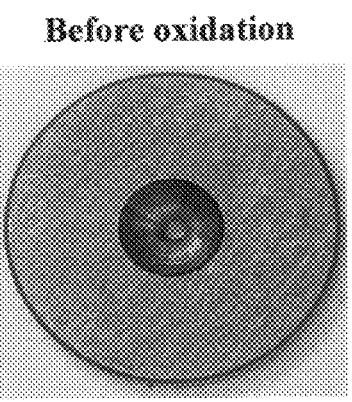
FIGS. 7(a)–(d) are top and bottom views of an injector nozzle machined from FeAl before and after oxidation at 1100° C. for 40 hours.
Figure 7B:
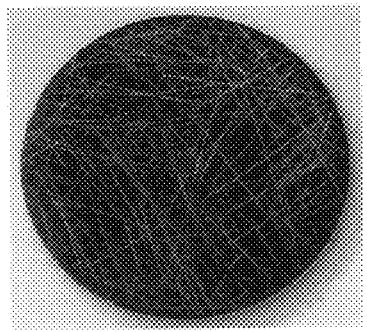
Figure 7C:
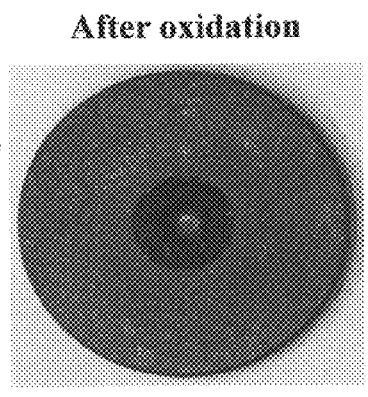
Figure 7D:
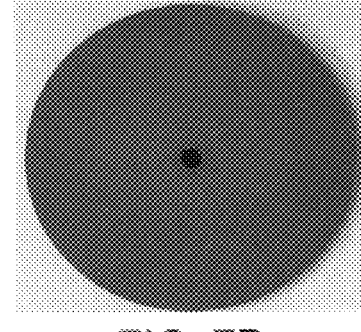
Figure 8A:
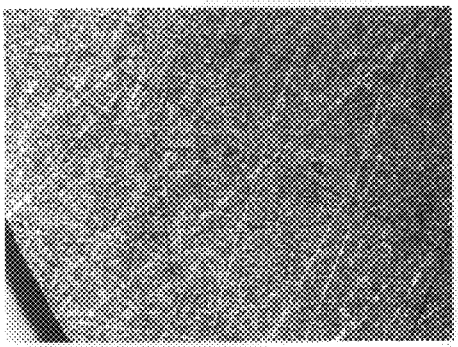
FIGS. 8(a)–(d) are close up photo micrographs of the surfaces of an injector nozzle machined from FeAl before and after oxidation at 1100° C. for 40 hours.
Figure 8B:
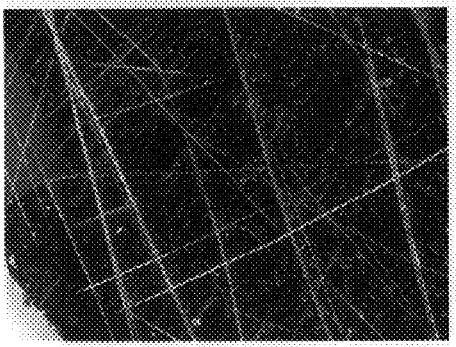
Figure 8C:
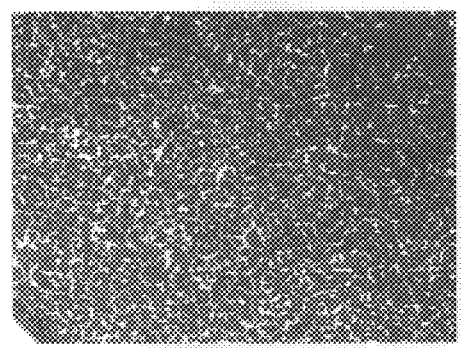
Figure 8D:
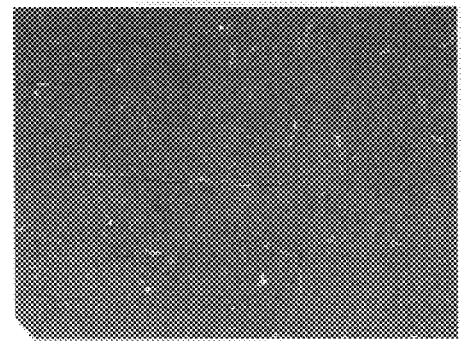

A protective oxide layer can be provided on the iron aluminide by oxidizing the material. FIGS. 7(a)–(b) are top and bottom surface images, respectively, of an injector nozzle machined from hot extruded iron aluminide before oxidation and FIGS. 7(c)–(d) are top and bottom surface images, respectively, of the injector nozzle after oxidation at 1100° C. for 40 hours. FIGS. 8(a)–(d) are surface images of the injector nozzle of FIGS. 7(a)–(d) magnified to reveal more details of the surface and the microstructure of the injector nozzle.

Figures 9A, 9B:
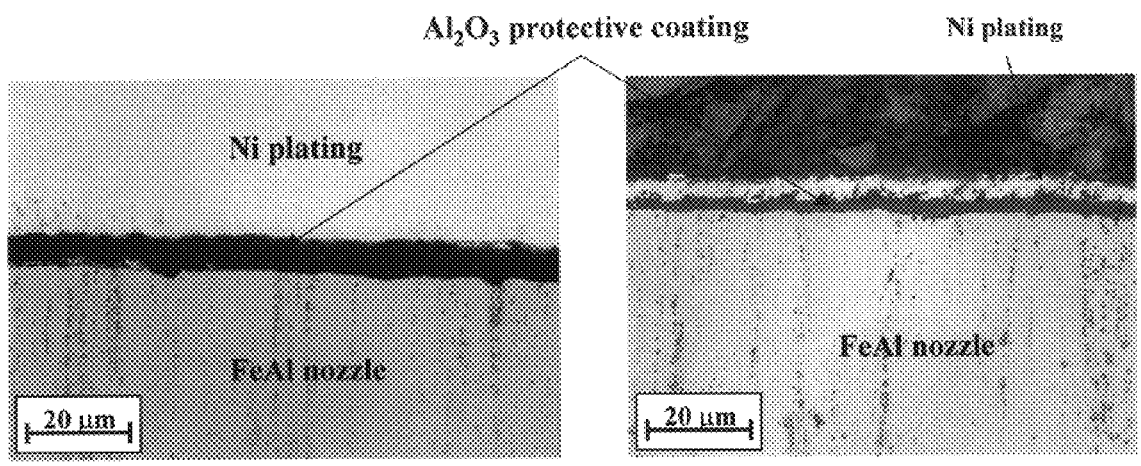
FIGS. 9(a)–(b) are micrographs of cross sections of an FeAl injector nozzle after oxidation at 1100° C. for 40 hours and 225 hours.
Figure 10:
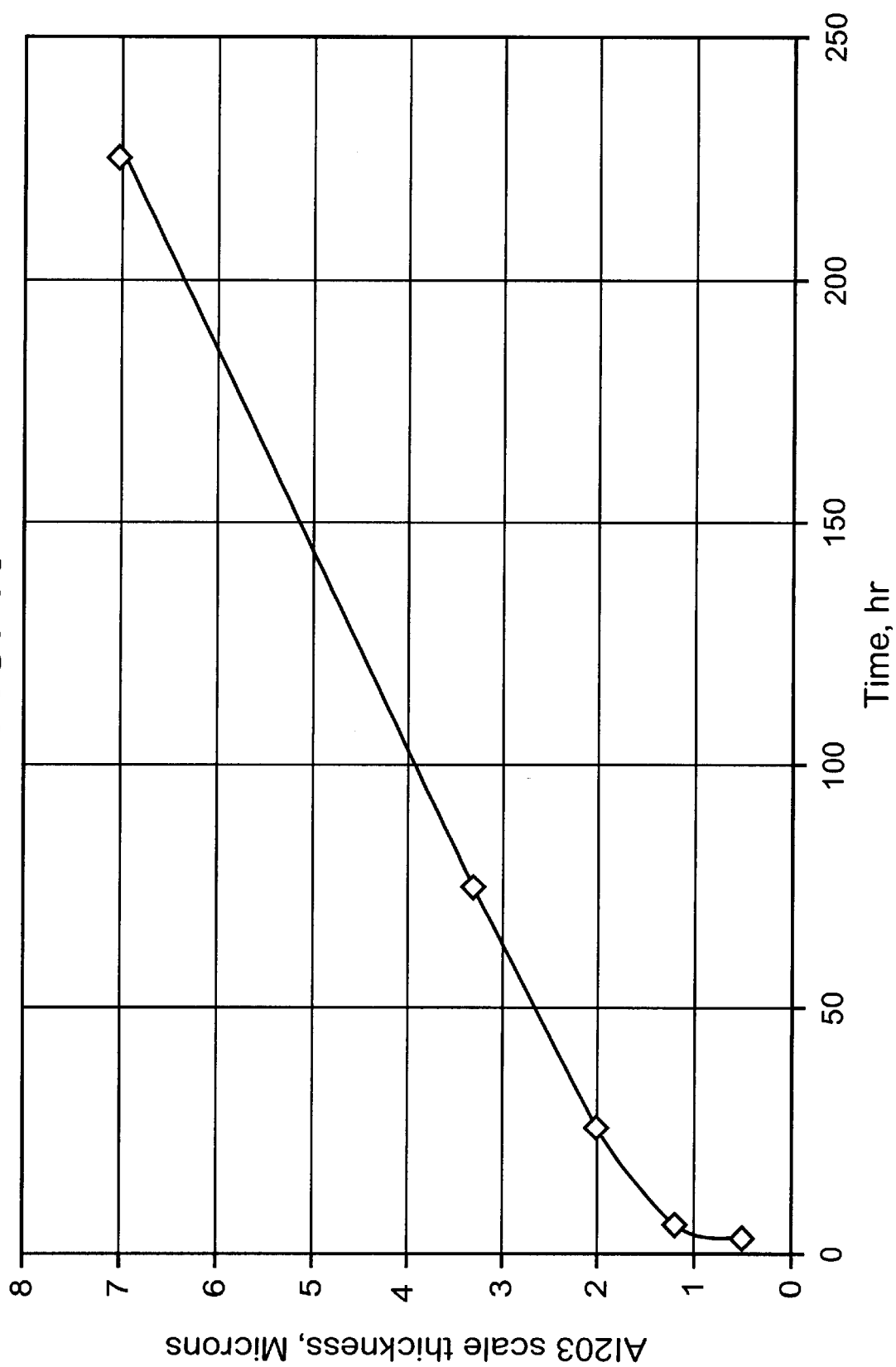
FIG. 10 is a graph representing the thickness of an alumina layer formed by oxidation in air at 1100° C. of an injector nozzle made from hot extruded FeAl.

FIGS. 9(a)–(b) are micrographs of cross sections of an iron aluminide injector nozzle after oxidation at 1100° C. for (a) 40 hours and (b) 225 hours. For purposes of measuring the thickness of the oxide layer produced during the oxidation treatment, a nickel plating was provided over the oxide layer. FIG. 10 is a graph representing thickness of the oxide layer formed by the oxidation treatment. The graph reveals that oxidation over a period of 40 hours provides an oxide layer of between 2 and 3 $\mu$m whereas after 225 hours the oxide layer is approximately 7 $\mu$m thick.

The iron aluminide alloy preferably includes at least 8 wt. % aluminum, more preferably 14 to 32 wt. % aluminum, up to 20 vol. % oxide particles, up to 0.020 wt. % B, up to 2.0 wt. % Mo, up to 1.0 wt. % Zr, up to 2.0 wt. % Nb, up to 2.0 wt. % Ti, up to 1.0 wt. % La, up to 1 wt. % C, up to 1 wt. % Cr, up to 5 wt. % W, and the balance iron and impurities. The iron aluminide preferably exhibits good wear resistance, coking and carburization resistance. Examples of other suitable iron aluminide alloys and processing techniques can be found in commonly owned U.S. Pat. No. 5,620,651. In the case of powder processed components, suitable sintering techniques are disclosed in commonly owned U.S. Pat. Nos. 5,976,458; 6,030,472; 6,033,623 and commonly owned U.S. patent application Ser. No. 09/750,002, the disclosures of which is hereby incorporated by reference.

The fuel injector component can be made from an iron aluminide alloy powder. Such powder can be provided in any form and several techniques can provide control over the size, shape, and surface morphology of particles and powders of the alloy. In one aspect, the powder can be formed by mechanical alloying, gas atomization or water atomization processes. Gas atomization produces spherical shaped powders and water atomization produces irregular shaped powders. The powders can be treated in a subsequent alloying or oxide and binder removal step. Examples of gas atomization and water atomization techniques are given in commonly owned U.S. Pat. No. 6,030,472, the disclosure of which is herein incorporated by reference.

If desired, the iron aluminide alloy powder can comprise nanosized powders. Examples of suitable techniques for forming nanosized powders include atomizing, laser evaporation and chemical techniques. Suitable techniques are disclosed in commonly owned U.S. patent application Ser. No. 09/660,962 filed Sep. 13, 2000, now U.S. Pat. No. 6,368,406, and PCT/US00/29105, the disclosures of which are herein incorporated by reference.

An iron aluminide powder can be consolidated into a shape which is pressed and sintered into the shape of the desired component. Examples of suitable powder processing techniques are disclosed in commonly owned U.S. patent application Ser. No. 09/660,949 filed Sep. 13, 2000, the disclosure of which is herein incorporated by reference. Such manufacturing methods include hot working a powder metallurgical compact.

In an exemplary method, consolidation of iron aluminide alloy powder is performed by metal injection molding (MIM), cold isostatic pressing (CIP), hot isostatic pressing (HIP) or the like. Other methods include machining an extruded iron aluminide alloy material or a coating of the alloy can be formed by spraying techniques such as plasma spraying, or reaction synthesis. Examples of suitable reaction synthesis techniques are disclosed in commonly owned U.S. Pat. No. 6,033,623, the disclosure of which is herein incorporated by reference. Cold working and annealing techniques including thermomechanical powder processing are disclosed in commonly owned U.S. Pat. No. 6,030,472, the disclosure of which is herein incorporated by reference. Hot and cold isostatic processing techniques and sintering techniques are disclosed in commonly owned U.S. Pat. Nos. 5,620,651 and 5,976,458, both disclosures of which are incorporated herein by reference.

In the exemplary embodiment, the component is formed from an iron aluminide alloy with 8 to 32 wt. % aluminum and one or more optional alloying elements. The iron aluminide can be a cast material which is extruded into a desired shape and machined into the desired fuel injection component. To provide enhanced oxidation resistance, the part can be oxidized to provide a protective alumina layer.

Alternatively, the component of the fuel injector can be a metal alloy such as a nickel base or steel alloy, for example HP steel, INCO 803 or 440C steel, having an iron aluminide alloy disposed as a coating on a fuel exposed surface thereof. For example, a steel body can be prepared by any suitable technique and the iron aluminide coating can be applied by a diffusional reaction between the steel and aluminum (hot dipping or aluminizing) or by a cathodic plasma process. The iron aluminide alloy layer can be originally deposited as the desired iron aluminide alloy or as pure aluminum that upon heating diffusion reacts to form the iron aluminide alloy.

In general, the component can be formed partly or entirely of the aluminide alloy by techniques such as casting (e.g., sand casting, investment casting, gravity casting, etc.), forging (e.g., impact forging or the like), or powder processing (e.g., sintering elemental or prealloyed powders).

A cast aluminide component can be prepared by any suitable casting technique such as sand casting, investment casting, gravity casting or the like. The investment casting process comprises steps of melting an aluminide alloy composition, filling a mold with the molten metal, cooling the molten metal so as to form at least a portion of a cast component and removing the component from the mold. During melting of the iron aluminide alloy, the heat of formation of FeAl can be used to melt the alloy ingredients, e.g., as Al melts it reacts with Fe to form FeAl and the heat of formation of FeAl raises the temperature to form liquid FeAl. Porosity in the melt due to hydrogen can be reduced by blowing an inert gas such as argon through the melt. Also, the casting step can be carried out in an inert gas atmosphere such as argon. The investment casting process can carried out by any suitable technique. See, for example, "Investment Casting" by Robert A. Horton, ASM Handbook Ninth Edition entitled "Casting", Volume 15, 1988, pages 253–269, the disclosure of which is hereby incorporated by reference.

A forged aluminide component can be prepared by any suitable forging technique such as precision forging, isothermal and hot-die forging. The forging process comprises steps of using a member such as a punch and/or die to form an aluminide alloy composition into a desired shape. The aluminide alloy can be in the form of a loose or compacted powder or a monolithic body such as a section of an extruded billet, casting or the like. The aluminide can be hot forged at temperatures of 800° C. and above. The iron aluminide powder can be canned in mild steel which is removed after the forging step. The forging process can carried out by any suitable technique. See, for example, "Forging Processes" by G. D. Lahoti, ASM Handbook Ninth Edition entitled "Forming and Forging", Volume 14, 1988, pages 59–212, the disclosure of which is hereby incorporated by reference.

A machined component can be formed by machining the component from a piece of cast, hot worked, cold worked, annealed, sintered or otherwise processed aluminide material. For example, the component can be machined from a billet of aluminide material. The aluminide could be heat treated before and/or after machining to provide desired mechanical properties of the aluminide material.

A sintered aluminide component can be prepared by any suitable powder metallurgical technique such as slip casting, freeze casting, injection molding, die compaction or the like. The process can include powder compaction (e.g., cold pressing, warm compaction, hot compaction, isostatic pressing, forging, etc.) to form a shaped part of an aluminide alloy composition, and heating the shaped part to a temperature sufficient to achieve sintering the powders together. The compaction and sintering process can carried out by any suitable technique. See, for example, "Powder Shaping and Consolidation Technologies" by B. Lynn Ferguson and Randall M. German, ASM Handbook Ninth Edition entitled "Powder Metal Technologies and Applications", Volume 7, 1988, pages 311–642, the disclosure of which is hereby incorporated by reference.

The sintered aluminide component can be prepared by a reaction synthesis powder metallurgical technique, comprising steps of forming a powder mixture comprising a first powder of $Fe_xAl_y$ or alloy thereof wherein $x \geq 1$, $y \geq 1$, $x > y$ or $y > x$ and a second powder comprising Fe or alloy thereof, and heating the powder mixture with or without alloying additives so as to react the first powder with the second powder to form a sintered shape. Details of a suitable reaction synthesis process which can be used to form the component in accordance with the invention are set forth in commonly owned U.S. Pat. No. 6,033,623 and in Ser. No. 09/750,002 filed on Dec. 29, 2000, the disclosures of which are hereby incorporated by reference. Alternatively, the powder can be a prealloyed powder which is sintered into the desired shape.

A coating forming a fuel exposed surface of the component can be formed by sintering elemental powders or a prealloyed powder can be used to form the coating. If desired, the sintered aluminide can include ceramic particles and/or fibers of carbides, nitrides, oxides, silicides, and/or borides. For example, the aluminide can include particles of alumina, yttria, silicon nitride, zirconia, titanium boride or the like. More generally, the particles/fibers can include nitrides and/or carbides of transition metals such as Zr, Ti, W, Nb and/or Hf.

In preparing an FeAl or $Fe_3Al$ iron aluminide component, the first powder can comprise one or more materials selected from $Fe_2Al$, $FeAl_3$, $FeAl_2$, $Fe_3Al$ or alloys thereof and the second powder can comprise one or more materials selected from FeAl, $Fe_2Al_5$, $FeAl_3$, $FeAl_2$, $Fe_3Al$ or alloys thereof and/or Fe or an iron base alloy powder. For example, during the heating step, $Fe_2Al_5$ can be reacted with Fe to form FeAl or $Fe_3Al$. By adjusting the contents of aluminum, iron and optional alloying additions in the powder mixture, it is possible to form a sintered compact consisting of FeAl or $Fe_3Al$ or alloys thereof. The heating step is preferably carried out in a vacuum or inert gas (e.g., Ar, He, $N_2$, etc.) environment such that expansion of the sintered compact due to volume change during formation of the FeAl or $Fe_3Al$ is less than 10% and/or the FeAl or $Fe_3Al$ initially forms as a layer between the iron or iron base alloy powder and the $Fe_2Al_5$. In a preferred process, the powder mixture is heated at a heating rate of less than 15° C./min and/or the sintered compact is heated sufficiently to increase the density of the sintered compact to at least 98% of the theoretical density. The process can include a step of pressing the powder mixture into a shaped component. According to the process, reactions which can sequentially occur during the heating steps include the initial formation of FeAl or $Fe_3Al$ by an interfacial reaction between pure Fe or an iron base alloy powder and $Fe_xAl_y$, and the balance of the FeAl or $Fe_3Al$ is formed by solid state diffusion.

The iron aluminide alloy can have an $Fe_3Al$ or FeAl base stoichiometry. The iron aluminide alloy can include in weight %, $\leq 32\%$ Al, $\leq 2\%$ Mo, $\leq 1\%$ Zr, $\leq 2\%$ Si, $\leq 30\%$ Ni, $\leq 10\%$ Cr, $\leq 0.3\%$ C, $\leq 0.5\%$ Y, $\leq 0.1\%$ B, $\leq 1\%$ Nb and $\leq 1\%$ Ta. A preferred composition is in weight %, 10–32% Al, 0.3–0.5% Mo, 0.05–0.3% Zr, 0.01–0.5% C, $\leq 0.1\%$ B, $\leq 1\%$ oxide particles, balance including Fe, more preferably, 20–32% Al, 0.3–0.5% Mo, 0.05–0.3% Zr, 0.01–0.5% C, 0.001 to 0.2% B, balance including Fe. Examples of suitable iron aluminide compositions which can be used to make the fuel injector component in accordance with the invention are set forth in commonly owned U.S. Pat. Nos. 5,595,706; 5,620,651; 6,033,623; 5,976,458; and 6,030,472, the disclosures of which are hereby incorporated by reference.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. An iron aluminide fuel injector component having a fuel contacting surface thereof defining a portion of a fuel path, the fuel contacting surface comprising iron aluminide.

2. The component of claim 1, wherein the component comprises an injector nozzle having a recess in a surface thereof and an outlet extending from the recess to an opposite surface thereof, the recess optionally including an oxide layer thereon.

3. The component of claim 1, wherein the iron aluminide is a cast and extruded iron aluminide alloy or a sintered iron aluminide alloy.

4. The component of claim 3, wherein the iron aluminide comprises at least 8 wt. % aluminum.

5. The component of claim 4, wherein the iron aluminide alloy further comprises up to 5 wt. % total of one or more refractory and transition metals.

6. The component of claim 4, wherein the iron aluminide alloy further comprises B and/or C in an amount effective to provide borides and/or carbides in the iron aluminide alloy.

7. The component of claim 4, wherein the iron aluminide alloy comprises:
   8 to 32 wt. % Al;
   up to 0.020 wt. % B;
   up to 2.0 wt. % Mo;
   up to 1.0 wt. % Zr;
   up to 2.0 wt. % Ti;
   up to 1.0 wt. % La;
   up to 0.2 wt. % C;
   up to 5 wt. % Cr;
   balance Fe and impurities.

8. The component of claim 3, wherein the iron aluminide alloy is a sintered nanocrystalline iron aluminide powder.

9. The component of claim 3, wherein the iron aluminide alloy comprises a coating on a body of a steel or nickel base alloy.

10. The component of claim 9, wherein the coating includes a surface oxide layer which contacts fuel passing through the fuel injector.

11. The component of claim 3, wherein the fuel contacting surface includes an alumina layer formed by oxidizing the iron aluminide alloy.

12. A method of manufacturing the component of claim 1, comprising the steps of:
   forming iron aluminide powder into a body; and
   sintering the body to a density of at least 90% theoretical density.

13. The method of claim 12, wherein the forming step comprises powder injection molding, hot pressing or cold pressing.

14. The method of claim 12, wherein the component comprises a fuel injector nozzle having a valve seat in one surface thereof and a fuel injection passage extending from the valve seat to an opposite surface thereof, the method further comprising oxidizing the iron aluminide so as to form an alumina layer on the valve seat.

15. A method of manufacturing the component of claim 1, comprising the steps of:
   extruding a casting of the iron aluminide into an extruded shape; and
   machining the extruded shape into the component.

16. The method of claim 15, wherein the component comprises a fuel injector nozzle having a valve seat in one surface thereof and a fuel injection passage extending from the valve seat to an opposite surface thereof, the method further comprising oxidizing the iron aluminide so as to form an alumina layer on the valve seat.

17. A method of manufacturing the component of claim 1, comprising forming the fuel contacting surface by coating a steel or nickel base alloy body with the iron aluminide.

18. The method of claim 17, wherein the component comprises a fuel injector nozzle having a valve seat in one surface thereof and a fuel injection passage extending from the valve seat to an opposite surface thereof, the method further comprising oxidizing the iron aluminide so as to form an alumina layer on the valve seat.

19. The method of claim 17, wherein the coating is formed by a diffusional reaction between the steel body and aluminum, a cathodic plasma process, chemical vapor deposition or physical vapor deposition.

20. A method of manufacturing the component of claim 1, comprising forming an alumina layer on the fuel contacting surface by oxidizing the iron aluminide.

* * * * *